(12) United States Patent
Chevallier et al.

(10) Patent No.: US 12,275,090 B2
(45) Date of Patent: Apr. 15, 2025

(54) PROCESS FOR PROTECTING A PART MADE OF AN ALUMINUM-BASED ALLOY CONTAINING COPPER

(71) Applicant: SAFRAN ELECTRONICS & DEFENSE, Paris (FR)

(72) Inventors: Coralie Chevallier, Moissy-Cramayel (FR); Mathieu Leroy, Moissy-Cramayel (FR); Marie Savoye, Moissy-Cramayel (FR); Etienne Nemeth, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 18/255,716

(22) PCT Filed: Dec. 2, 2021

(86) PCT No.: PCT/FR2021/052191
§ 371 (c)(1),
(2) Date: Jun. 2, 2023

(87) PCT Pub. No.: WO2022/117970
PCT Pub. Date: Jun. 9, 2022

(65) Prior Publication Data
US 2024/0017356 A1    Jan. 18, 2024

(30) Foreign Application Priority Data

Dec. 3, 2020  (FR) ........................................ 2012619

(51) Int. Cl.
*C23C 28/00* (2006.01)
*B23K 26/352* (2014.01)
(Continued)

(52) U.S. Cl.
CPC ............ *B23K 26/352* (2015.10); *C25D 11/24* (2013.01); *C25D 13/22* (2013.01); *C22C 21/12* (2013.01); *C23C 22/56* (2013.01); *C23C 2222/10* (2013.01)

(58) Field of Classification Search
CPC ......... C23C 28/00; C23C 28/04; C25D 11/04; C25D 5/48; C25D 13/20
(Continued)

(56) References Cited

U.S. PATENT DOCUMENTS

| 2014/0349137 | A1* | 11/2014 | Brandl .................... C22F 1/057 428/141 |
| 2018/0230617 | A1 | 8/2018 | Edge |

(Continued)

FOREIGN PATENT DOCUMENTS

| CN | 107385493 A * | 11/2017 | ............. C25D 11/02 |
| DE | 102005017088 A1 | 10/2006 | |

(Continued)

OTHER PUBLICATIONS

French Search Report issued in French Application No. 20 12619, mailed on Jul. 14, 2021.

(Continued)

*Primary Examiner* — Edna Wong
(74) *Attorney, Agent, or Firm* — Bookoff McAndrews, PLLC

(57) ABSTRACT

Process for protecting a part comprising an aluminum-based alloy having a copper content greater than or equal to 0.5% by mass, the process comprising depositing a non-conductive protective layer over the entire part, laser pickling by means of a laser beam of an area of the non-conductive protective layer so as to form an unprotected area, chemical (Continued)

conversion, with trivalent chromium, of the unprotected area so as to form a conductive protective layer, and drying of the part.

10 Claims, 2 Drawing Sheets

(51) Int. Cl.
| | |
|---|---|
| *C23C 28/04* | (2006.01) |
| *C25D 5/48* | (2006.01) |
| *C25D 11/04* | (2006.01) |
| *C25D 11/24* | (2006.01) |
| *C25D 13/02* | (2006.01) |
| *C25D 13/22* | (2006.01) |
| *C22C 21/12* | (2006.01) |
| *C23C 22/56* | (2006.01) |

(58) Field of Classification Search
USPC .................................. 205/201, 221, 222, 223
See application file for complete search history.

(56) References Cited

U.S. PATENT DOCUMENTS

| | | | |
|---|---|---|---|
| 2018/0290473 A1* | 10/2018 | Leal-Ayala | .......... B41M 7/0009 |
| 2020/0040461 A1* | 2/2020 | Gurt Santanach | ........ C23C 8/02 |
| 2020/0141006 A1 | 5/2020 | Epp et al. | |
| 2021/0032767 A1* | 2/2021 | Sio | .......................... B32B 18/00 |

FOREIGN PATENT DOCUMENTS

| | | | | |
|---|---|---|---|---|
| FR | 3051805 A1 * | 12/2017 | ............. | C23C 22/34 |
| JP | 2002283763 A * | 10/2002 | ............... | B41N 1/08 |
| KR | 880000683 B1 * | 4/1988 | ............. | B23K 20/04 |
| WO | WO-9959826 A1 * | 11/1999 | ........... | B41C 1/1033 |
| WO | WO-2017208101 A1 * | 12/2017 | ............. | B23K 26/36 |
| WO | WO-2018099801 A1 * | 6/2018 | ............ | F21V 29/502 |
| WO | WO-2020061056 A1 * | 3/2020 | ............. | B23K 20/24 |

OTHER PUBLICATIONS

International Search Report and Written Opinion issued in International Application No. PCT/FR2021/052191, mailed on Mar. 25, 2022.

* cited by examiner

[Fig. 1]
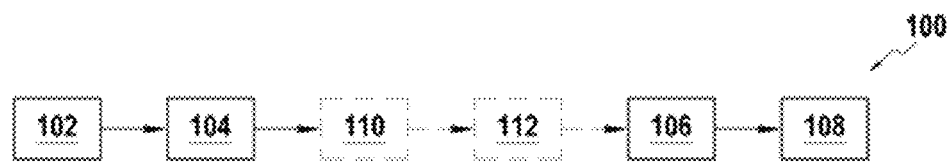
[Fig. 2]
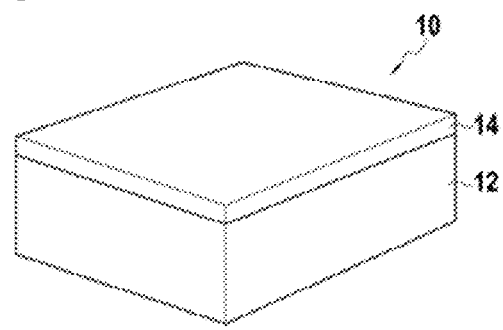
[Fig. 3]
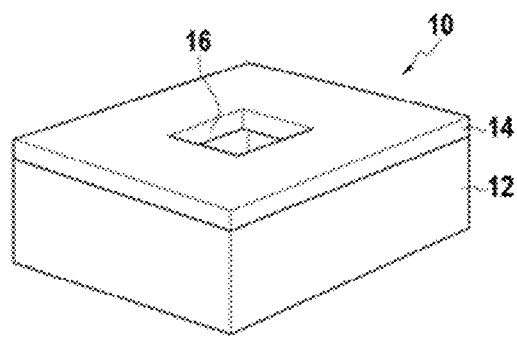
[Fig. 4]
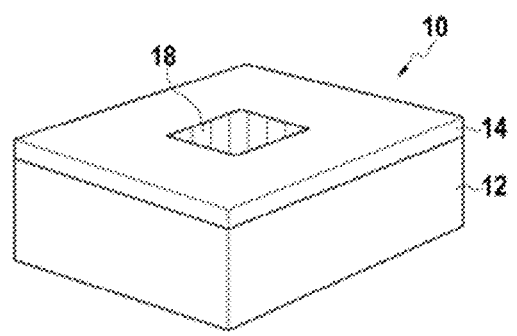

[Fig. 5]
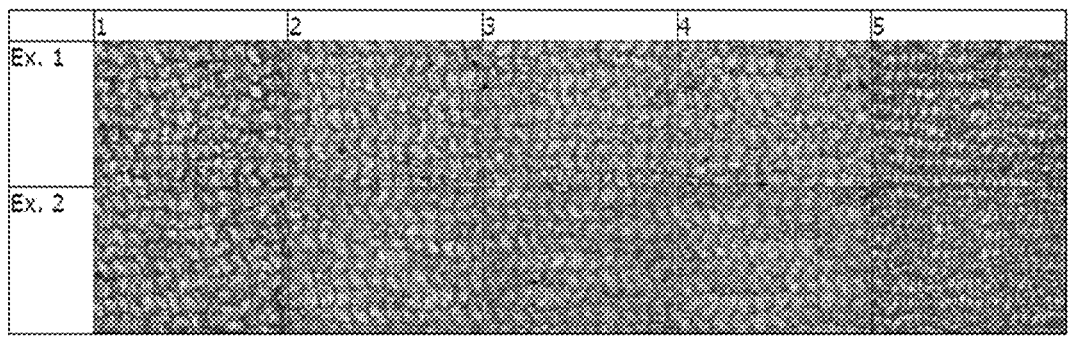

PROCESS FOR PROTECTING A PART MADE OF AN ALUMINUM-BASED ALLOY CONTAINING COPPER

CROSS-REFERENCE TO RELATED APPLICATIONS

This is a National Stage Application under 35 U.S.C. § 371 of International Application No. PCT/FR2021/052191, filed Dec. 2, 2021, now published as WO 2022/117970 A1, which claims priority to French Patent Application No. 2012619, filed on Dec. 3, 2020.

TECHNICAL FIELD

This disclosure relates to the protection, for example against corrosion, of a part comprising an aluminum-based alloy containing copper, in particular more than 0.5% by mass of copper.

PRIOR ART

Aluminum-based alloys have the advantage of being light. However, they can be susceptible to corrosion. Also, it is known to protect parts made from aluminum-based alloys against corrosion by carrying out, for example, a chemical conversion of the surface of the part.

This chemical conversion treatment was generally carried out by contacting the part with a bath containing hexavalent chromium (or chromium VI or Cr VI). The bath may be made from a solution such as, for example, the solution commonly designated by the registered trademark Alodine® 1200S from Henkel. This chemical conversion treatment is a chromate treatment of the aluminum-based alloy during which the alloy is converted at the surface in order to precipitate therein in particular aluminum oxy-hydroxides and aluminum chromates. This treatment allows to produce a coating on the surface of the part which increases the resistance to corrosion of the part made of an aluminum-based alloy. Moreover, this coating allows to retain electrical conductivity of the coated area and to allow easy and good quality adhesion of organic paints which are generally also based on hexavalent chromium.

Moreover, in the process used, the chemical conversion is carried out over the entire part. A paint is then applied but in order to preserve areas of electrical continuity on the part, each of these areas is covered with a resist. This operation is usually carried out manually, for example by applying a protective adhesive to the areas that are to be kept free of paint.

However, in application of the REACH (acronym for "Registration, Evaluation, Authorization and Restriction of Chemicals") regulation, the use of hexavalent chromium has been prohibited.

Chromate bath solutions have been developed from trivalent chromium. However, in particular for aluminum-based alloys containing copper, the chromate treatment does not allow to guarantee sufficient corrosion resistance.

There is therefore a need to develop new processes allowing to improve the corrosion resistance of aluminum-based alloy parts, in particular for aluminum-based alloys of the 2000 and 7000 series, and also to simplify the process steps and/or reduce production costs while improving process reliability.

DISCLOSURE OF THE INVENTION

The present disclosure aims at least at partially overcoming these disadvantages.

This disclosure relates to a process for protecting a part including an aluminum-based alloy having a copper content greater than or equal to 0.5% by mass, the process including the following steps:

- depositing a non-conductive protective layer over the entire part;
- laser pickling by means of a laser beam of an area of the non-conductive protective layer so as to form an unprotected area having a surface roughness Ra less than or equal to 1.8 μm;
- chemical conversion, with trivalent chromium, of the unprotected area so as to form a conductive protective layer;
- drying of the part.

The process for protecting aluminum-based alloy parts containing at least 0.5% by mass of copper allows to obtain a treated part which is effectively protected in particular from corrosion by a coating comprising conductive areas (areas having undergone chemical conversion—conductive protective layer) and non-conductive areas (areas bearing the non-conductive protective layer). The part then has, on the areas protected by the conductive protective layer, less than five pitting per $dm^2$ (square decimeter) after exposure to neutral salt spray for 168 hours, according to the requirements of standard NF EN ISO 9227:2017. It is understood that the non-conductive protective layer does not undergo the chemical conversion. The non-conductive protective layer is not altered or modified by the chemical conversion step. And, conversely, the non-conductive protective layer does not pollute the chemical conversion bath. Thus, the step of chemical conversion, with trivalent chromium, takes place only on the unprotected areas which have been previously pickled during the laser pickling step.

By way of non-limiting example, the 2000 Series and a portion of the 7000 Series of aluminum-based alloys have a copper content greater than or equal to 0.5% by mass.

Since the areas undergoing the chemical conversion are exposed by laser pickling, the manual step of applying resists is no longer required.

Laser pickling allows to expose the part for specific areas where it is desired to have conductive portions for protection against corrosion. It is understood that the number of unprotected areas is not limited to one. During the laser pickling step, the non-conductive corrosion protection layer is removed only in areas where electrical continuity between the part and external elements is desired. In these unprotected areas, the part is therefore exposed again. The surface roughness Ra (arithmetic mean deviation) being less than or equal to 1.8 μm, the pickled area, that is to say exposed, has a satisfactory surface condition and allowing to obtain a treated part which is effectively protected in particular from corrosion in the areas having the coating including conductive and non-conductive areas.

The step of chemical conversion, with trivalent chromium, is known per se. Typically, the conditions of implementation are provided with the technical data sheets by the manufacturers of the chemical conversion baths.

By way of non-limiting example, the chromate bath may be a bath marketed under the brand name SurTec650® or Lanthane 613.3®.

After immersion in a chemical conversion bath, the part is rinsed with demineralized water and dried. By way of non-limiting example, it may involve rinsing by immersion followed by rinsing by spraying with demineralized water.

By way of non-limiting example, the drying step may be carried out at ambient temperature under compressed air and/or in an oven at a temperature less than or equal to 60°

C. (degrees Celsius). It is understood that compressed air may be used at room temperature and then the part may be put in a study at a temperature less than or equal to 60° C. until the part is dry.

In some embodiments, the surface roughness Ra is less than or equal to 1.7 µm, preferably less than or equal to 1.6 µm.

In some embodiments, the unprotected area may be cleaned after laser pickling.

This step allows to remove residues, for example in the form of powder, which may have been formed during the laser pickling step.

In some embodiments, the cleaning of the unprotected area may be carried out by mechanical brushing.

In some embodiments, the cleaning of the unprotected area may be assisted by ultrasound.

In some embodiments, prior to the chemical conversion, the non-conductive protective layer and the unprotected area may be degreased with a solvent and/or an alkaline solution.

This step allows to degrease the part when the non-conductive protective layer and/or the unprotected area have dirt of the "fingerprint" type which may result from successive handlings of the part during the previous steps.

It is understood that the degreasing step is not carried out by means of an acid solution.

By way of non-limiting example, the solvent may be ethanol or methylethyl ketone (butanone-2, also called MEK in accordance with the acronym for MethylEthylKetone).

By way of non-limiting example, the alkaline solution may be a solution marketed under the name Sococlean A3432.

In some embodiments, the laser pickling may be carried out by means of a YAG laser with a wavelength of 1064 nm at a frequency comprised between 10 and 200 kHz.

In some embodiments, a profile of the laser beam may be Gaussian shaped or flat topped.

A flat topped laser beam profile is also referred to as a "Top Hat".

In some embodiments, the non-conductive protective layer may be deposited by anodic oxidation.

In some embodiments, the laser beam may have a fluence greater than or equal to 4 J/cm$^2$.

In some embodiments, the laser beam may have a fluence less than or equal to 65 J/cm$^2$, preferably less than or equal to 56 J/cm$^2$.

In some embodiments, the non-conductive protective layer is deposited by anaphoresis.

In some embodiments, the laser beam may have a fluence greater than or equal to 4 J/cm$^2$ and the laser pickling may comprise one to four passes.

In some embodiments, the laser beam may have a fluence less than or equal to 56 J/cm$^2$ and the laser pickling may comprise one to four passes.

In some embodiments, the laser pickling may be carried out with a laser beam coverage rate greater than or equal to 20% and less than or equal to 80%.

It is understood that the coverage rate may be in one or both directions of movement of the laser beam. The values in the two directions may be different from each other.

By way of non-limiting example, the coverage rate may be equal to 50% in both directions.

BRIEF DESCRIPTION OF THE DRAWINGS

Other features and advantages of the object of this disclosure will emerge from the following description of embodiments, given by way of non-limiting examples, with reference to the appended figures.

FIG. 1 is a flowchart showing the steps of a process for protecting a part comprising an aluminum-based alloy.

FIG. 2 is a sectional and perspective partial schematic view of a part with a non-conductive protective layer.

FIG. 3 is a sectional and perspective partial schematic view of the part of FIG. 2 after laser pickling.

FIG. 4 is a sectional and perspective partial schematic view of the part of FIG. 3 after chemical conversion and drying.

FIG. 5 is a summary of micrographs of an unprotected area after laser pickling with the laser.

In all the figures, the elements in common are identified by identical reference numerals.

DETAILED DESCRIPTION

FIG. 1 shows a process 100 for protecting, in particular against corrosion, a part 12 comprising an aluminum-based alloy, having a copper content greater than or equal to 0.5% by mass.

The process 100 comprises a first step of depositing 102 a non-conductive protective layer 14 over the entire part 12, as shown in FIG. 2.

It will be noted that FIG. 2 is a schematic partial sectional view of an element 10. It is therefore understood that the part 12 is entirely covered by the non-conductive protective layer 14. A partial sectional view was shown in order to see the part 12 and the non-conductive protective layer 14.

The step 102 of depositing the protective layer 14 may be carried out by anodic oxidation or by anaphoresis.

Anodic oxidation is a process allowing to form a porous oxide layer on the outer surface of the part 12 by immersing the part 12 in an acid bath and applying an electric voltage between the part 12 serving as anode and a counter electrode. By way of non-limiting example, the acid bath may be a sulfuric acid bath. The step of depositing 102 the protective layer also comprises the sealing of the pores of the porous oxide layer by immersion in an impregnation and sealing bath to obtain the non-conductive protective layer 14. This process is a conventional process.

Anaphoresis is a process for forming the non-conductive protective layer 14 by immersing the part 12 in a bath of electrically charged paint, and which, under the effect of an electrical voltage applied between the part serving as anode and a counter-electrode, is deposited on the part 12. Once the deposit has reached the desired thickness, the deposit is polymerized at a temperature allowing to fix the paint on the part 12 and form the non-conductive protective layer 14.

When the part 12 is completely coated with the non-conductive protective layer 14, the part 12 is protected against corrosion. However, this protective layer is non-conductive.

The process 100 comprises a step of laser pickling 104 by means of a laser beam of an area of the non-conductive protective layer 14 so as to form an unprotected area 16, as shown in FIG. 3. It is understood that the part 12 is exposed in the unprotected area 16.

The laser pickling 104 may be carried out by means of a YAG laser with a wavelength of 1064 nm at a frequency comprised between 10 and 200 kHz.

The profile of the laser beam may be Gaussian shaped or flat topped.

As shown in FIG. 3, the part 12, from which the non-conductive protective layer 14 has been removed in one area, has an unprotected area 16. It is understood that the number of unprotected areas 16 is not limited to one. FIG. 3 being a schematic figure, the unprotected area 16 is shown as having the shape of a square. It is understood that this shape is not limiting and that the unprotected area 16 may have any shape. The shape of the unprotected area 16 is defined by the passage of the laser beam over the non-conductive protective layer 14.

The process 100 comprises a step of chemical conversion 106, with trivalent chromium, of the unprotected area 16 so as to form a conductive protective layer 18, as shown in FIG. 4.

As shown schematically in FIG. 4, the non-conductive protective layer 14 is not altered or modified by the chemical conversion step 106. Thus, the step 106 of chemical conversion, with trivalent chromium, takes place only on the unprotected areas 16 which have been pickled beforehand during the laser pickling step 104 and the formation of the conductive protective layer 18 is formed only at the location of the unprotected areas 16.

The process 100 comprises a drying step 108. By way of non-limiting example, the drying step 108 may be carried out at ambient temperature under compressed air and/or in an oven at a temperature less than or equal to 60° C. (degree Celsius). It is understood that compressed air may be used at room temperature and then the part 12 may be put in a study at a temperature less than or equal to 60° C. until the part 12 is dry.

The process 100 may also comprise a step 110 of cleaning the unprotected area 16 after the laser pickling step 104.

When the unprotected area(s) 16 are covered with a light dusting due to laser pickling, it is advantageous to clean the unprotected areas 16 to remove these residues, for example in the form of powder, which may have been formed during the laser pickling step 104.

The cleaning 110 of the unprotected area 16 may be carried out by mechanical brushing.

The cleaning 110 of the unprotected area 16 may be assisted by ultrasound.

The process 100 may also comprise a degreasing step 112 of the non-conductive protective layer 14 and of the unprotected area 16 after the laser pickling step 104.

The degreasing step 112 may or may not be carried out after the cleaning step 110.

Thus, before the chemical conversion 106, the part 12 and the non-conductive protective layer 14 may be degreased 112 with a solvent and/or an alkaline solution.

This step allows to degrease the part when the non-conductive protective layer 14 and/or the unprotected area 16 have dirt of the "fingerprint" type which may result from successive handlings of the part during the preceding steps.

It is understood that the degreasing step 112 is not carried out by means of an acid solution.

By way of non-limiting example, the solvent may be ethanol or methyl ethyl ketone (butanone-2, also called MEK in accordance with the acronym for MethylEthylKetone By way of non-limiting example, the alkaline solution may be a solution marketed under the name Sococlean A3432.

Example 1

A 2024 aluminum-based alloy (machined T351) is used. The mass composition of this alloy is 0.046% silicon (Si), 0.077% iron (Fe), 4.4389% copper (Cu), 0.621% manganese (Mn), 1.416% magnesium (Mg), 0.002% Chromium (Cr), Zinc (Zn), 0.0310% Titanium (Ti), 0.0007% Boron (B), 0.0013% Zirconium (Zr), 0.0027% lead (Pb), 0.0044 nickel (Ni), 0.055% tin (Sn), 0.0076% vanadium (V), the remainder consisting of aluminum and possible impurities.

Example 2

An aluminum based alloy 7175 (machined T351) is used. The mass composition of this alloy is 0.041% silicon (Si), 0.083% iron (Fe), 1.773% copper (Cu), 0.001% manganese (Mn), 2.490% magnesium (Mg), 0.197% chromium (Cr), zinc (Zn), 0.0384% titanium (Ti), 0.0009% boron (B), 0.0037% zirconium (Zr), 0.0016% lead (Pb), 0.0054 nickel (Ni), 0.0024% tin (Sn), 0.0076% vanadium (V), the remainder consisting of aluminum and possible impurities.

Test Specimens

Test specimens having dimensions of 150 mm×100 mm×6 mm were produced in each alloy (Example 1 and Example 2).

Non-Conductive Protective Layer.

The test specimens underwent a detergent cleaning.

A non-conductive protective layer 14 was deposited on all the test specimens by anodic oxidation in a bath of sulfuric acid and sealing the porosity by immersion in an impregnation/sealing bath. By way of non-limiting example, the non-conductive protective layer 14 may have a thickness comprised between 4 and 20 μm.

When leaving the baths, the test specimens are rinsed with water.

Laser Pickling

The laser beam is a YAG laser with a wavelength of 1064 nm at a frequency comprised between 1 and 120 kHz, of the TruMark 6130 type. A one square decimeter unprotected area 16 was pickled on each test specimen, that is to say that the base alloy of each test specimen was exposed on an area of one square decimeter.

For the example 1 and for the example 2, five tests were carried out with a laser beam of Gaussian shape. The features are given in table 1. A single pass was carried out to pickle the unprotected area.

TABLE 1

|  | 1 | 2 | 3 | 4 | 5 |
|---|---|---|---|---|---|
| Impact diameter (μm) | 50 | 100 | 100 | 100 | 50 |
| Power (W) | 15 | 15 | 15 | 15 | 15 |
| Focal length (mm) | 254 | 254 | 254 | 254 | 254 |
| Pulse frequency (kHz) | 12 | 28 | 35 | 50 | 28 |
| Speed (mm/s) | 450 | 1400 | 1750 | 2500 | 700 |
| Fluence (J/cm$^2$) | 64 | 7 | 5 | 4 | 27 |
| Overlap Tx (%) | 25 | 50 | 50 | 50 | 50 |
| Overlap Ty (%) | 0 | 50 | 50 | 50 | 50 |
| Inclination with respect to the surface (°) | 0 | 0 | 0 | 0 | 0 |

The overlap rate is defined by considering the diameter of the laser spot and the overlap rate in one direction is defined as equal to (1−L/d) where L is the distance between the center of two adjacent laser spots in the given direction and the diameter of the laser spot. Thus, an overlap rate of 50% is representative of a distance between the center of two spots equal to half the diameter of the laser spot. Tx is the overlap rate in the direction x and Ty is the overlap rate in the direction y, the direction y being perpendicular to the direction x.

In these examples, Tx and Ty are equal. Tx might be different from Ty.

The surface roughness Ra (arithmetic mean deviation) was measured on the unprotected areas. For the example 1, the surface roughness Ra is equal to 0.8 μm for tests 1 and 3, 0.7 μm for tests 2 and 4 and 1.0 μm for test 5. For the example 2, the surface roughness Ra is equal to 1.2 μm for test 1, 0.6 μm for tests 2 and 3, 0.55 μm for test 4 and 0.8 μm for test 5. The surface roughness Ra (arithmetic mean deviation) is measured according to the requirements of the standard ISO 25178 with an optical roughness meter.

The unprotected areas have been tested and are all conductive.

FIG. 5 shows micrographs at the same magnification of the unprotected area 16 of test specimens from the tests carried out with the laser II.

Cleaning

The test specimens are cleaned, for example by brushing.

The brushing step improves the resistance to corrosion after chemical conversion.

Degreasing

The test specimens are degreased with a cloth soaked in methyl ethyl ketone.

Chemical Conversion

The bath is a bath of SurTec 650 having a theoretical concentration of 20% by volume of Surtec 650 in distilled water. The theoretical pH of the bath is comprised between 3.7 and 4 and the theoretical temperature of the bath is 37.5° C. The values measured are as follows: concentration: 20.1%; pH: 3.9; temperature: 37.5° C. in a 100 L (liter) tank. The test specimens undergo manual agitation.

The test specimens are rinsed by immersion in the bath for 1 minute in order to wet the surface in order to modify the surface tension of the test specimen. The test specimen is then rinsed with water before the actual chromate step. The test specimens are then immersed for 4 minutes in the bath to carry out the step of chemical conversion, with trivalent chromium, of the unprotected areas 16 and so as to form a conductive protective layer 18.

The test specimens are then rinsed by immersion in water for 1 minute and by spraying with water for 1 minute.

The surface roughness Ra (arithmetic mean deviation) and the surface roughness Rz (maximum height) were measured on the conductive protective areas 18. The surface roughness Ra (arithmetic mean deviation) and the surface roughness Rz (maximum height) are measured according to the requirements of the standard ISO 25178 with an optical roughness meter. The results are shown in Table 2.

TABLE 2

| | Ra (μm) | Standard deviation Ra (μm) | Rz (μm) | Standard deviation Rz (μm) |
|---|---|---|---|---|
| | | Example 1 | | |
| 1 | 1.19 | 0.04 | 17.28 | 0.42 |
| 2 | 1.17 | 0.01 | 15.16 | 0.70 |
| 3 | 1.13 | 0.02 | 15.36 | 0.67 |
| 4 | 1.12 | 0.04 | 16.57 | 1.73 |
| 5 | 1.58 | 0.01 | 19.13 | 0.78 |
| | | Example 2 | | |
| 1 | 1.70 | 0.01 | 17.96 | 0.45 |
| 2 | 0.952 | 0.003 | 13.58 | 1.47 |
| 3 | 0.89 | 0.01 | 14.40 | 1.23 |
| 4 | 0.91 | 0.02 | 15.92 | 0.52 |
| 5 | 1.4 | 0.01 | 17.28 | 0.73 |

Drying

The test specimens are then dried with compressed air spraying to remove the excess water and then placed in an oven at 55° C. until completely dry.

Salt Spray Test

The salt spray test is carried out according to the requirements of the standard ISO 9227:2017. The test conditions are listed below. The test is carried out in an ERICHSEN salt spray corrosion test chamber of reference CORROTHERM 610e 1000L. The sodium chloride salt (NaCl) used is 99% pure. Distilled water has an electrical conductivity of less than 10 μS/cm (micro Siemens per centimeter). The saline solution has a concentration of 50 g/L (grams per liter), the temperature in the chamber throughout the test is comprised between 34.6° C. and 35.3° C. and the temperature of the humidifier is 50° C. The spray pressure is comprised between 0.93 and 0.96 bar, the average recovery rate of the solution in the collectors is comprised between 1.26 and 1.36 mL/h (milliliter per hour), the density of the solution collected in the collectors is comprised between 1.031 and 1.035 and the pH of the solution collected in the collectors is 6.5.

The duration of the salt spray test is 168 hours maximum with a minimum of 72 hours.

Test specimens are removed from the enclosure after 72 hours and 168 hours and are visually observed to identify defects. All the test specimens tested show, on the areas protected by the conductive protective layer, less than five pitting per $dm^2$ after exposure to neutral salt spray for 168 hours, according to the requirements of standard NF EN ISO 9227:2017.

For certain test specimens which were treated according to the process described above, the brushing step was omitted. On some uncleaned test specimens, atypical corrosion (black streaks) being formed on the edge of the specimens was observed. (I preferred to moderate and put the information here in order to avoid making this step essential—it is presented as non-essential).

Although the present description has been described with reference to a specific embodiment, it is obvious that various modifications and changes can be made to these examples without departing from the general scope of the invention as defined by the claims. Furthermore, individual features of the various embodiments discussed may be combined in additional embodiments. Accordingly, the description and the drawings should be considered in an illustrative rather than restrictive sense.

The invention claimed is:

1. A process for protecting a part comprising an aluminum-based alloy having a copper content greater than or equal to 0.5% by mass, the process comprising:
   depositing a non-conductive protective layer over the part;
   laser pickling by means of a laser beam of an area of the non-conductive protective layer so as to form an unprotected area having a surface roughness Ra less than or equal to 1.8 μm, the laser pickling being carried out with a laser beam coverage rate greater than or equal to 20% and less than or equal to 80%;
   degreasing of the non-conductive protective layer and the unprotected area with an alkaline solution;
   chemical conversion, with trivalent chromium, of the unprotected area so as to form a conductive protective layer; and
   drying of the part.

2. The process according to claim 1, wherein the unprotected area is cleaned after laser pickling.

3. The process according to claim 2, wherein the cleaning of the unprotected area is carried out by mechanical brushing.

4. The process according to claim 2, wherein the cleaning of the unprotected area is assisted by ultrasound.

5. The process according to claim 1, wherein the laser pickling is carried out by means of a YAG laser with a wavelength of 1064 nm at a frequency comprised between 10 and 200 kHz.

6. The process according to claim 1, wherein a profile of the laser beam is Gaussian shaped or flat topped.

7. The process according to claim 1, wherein the non-conductive protective layer is deposited by anodic oxidation.

8. The process according to claim 7, wherein the laser beam has a fluence greater than or equal to 4 $J/cm^2$.

9. The process according to claim 1, wherein the non-conductive protective layer is deposited by anaphoresis.

10. The process according to claim 9, wherein the laser beam has a fluence greater than or equal to 4 $J/cm^2$ and the laser pickling comprises one to four passes.

* * * * *